US012626447B2

(12) United States Patent
Rabbani Rankouhi et al.

(10) Patent No.: US 12,626,447 B2
(45) Date of Patent: May 12, 2026

(54) PRUNING RAY TRACING TRAVERSAL OPERATIONS BASED ON LOCAL RAY PARAMETER VALUE

(71) Applicant: Apple Inc., Cupertino, CA (US)

(72) Inventors: Ali Rabbani Rankouhi, Bushey (GB); Luca O. Iuliano, Milton Keynes (GB); David J. Bermingham, Cambridge (GB); Christopher A. Burns, Austin, TX (US)

(73) Assignee: Apple Inc., Cupertino, CA (US)

( * ) Notice: Subject to any disclaimer, the term of this patent is extended or adjusted under 35 U.S.C. 154(b) by 179 days.

(21) Appl. No.: 18/524,265

(22) Filed: Nov. 30, 2023

(65) Prior Publication Data

US 2025/0095274 A1 Mar. 20, 2025

Related U.S. Application Data

(60) Provisional application No. 63/583,920, filed on Sep. 20, 2023.

(51) Int. Cl.
| | |
|---|---|
| *G06T 15/06* | (2011.01) |
| *G06T 1/20* | (2006.01) |
| *G06T 17/00* | (2006.01) |

(52) U.S. Cl.
CPC ............... *G06T 15/06* (2013.01); *G06T 1/20* (2013.01); *G06T 17/005* (2013.01); *G06T 2210/21* (2013.01)

(58) Field of Classification Search
CPC ......... G06T 15/06; G06T 1/20; G06T 17/005; G06T 2210/21
See application file for complete search history.

(56) References Cited

U.S. PATENT DOCUMENTS

| | | | |
|---|---|---|---|
| 8,188,997 B2 | 5/2012 | Dammertz et al. | |
| 9,430,863 B1 * | 8/2016 | Grunschloss | ........... G06T 15/06 |
| 9,633,467 B2 | 4/2017 | Bakalash | |
| 11,521,343 B2 | 12/2022 | Potter et al. | |
| 2020/0051315 A1 * | 2/2020 | Laine | .................... G06T 17/005 |
| 2022/0020201 A1 * | 1/2022 | Fenney | ................. G06T 15/506 |
| 2023/0252727 A1 * | 8/2023 | McAllister | ............ G06T 17/005 |
| | | | 345/419 |

* cited by examiner

*Primary Examiner* — Said Broome
*Assistant Examiner* — Jordan Wan Yick
(74) *Attorney, Agent, or Firm* — Kowert, Hood, Munyon, Rankin & Goetzel, P.C.; Michael B. Davis; Dean M. Munyon

(57) ABSTRACT

Techniques are disclosed relating to graphics processors that support ray tracing. In disclosed embodiments, ray intersect circuitry is configured to access a traversal stack used for traversal of multiple levels of a bounding volume hierarchy (BVH) acceleration data structure (ADS) according to a depth-first search to retrieve: coordinates of a first bounding region for a child node and a local ray parameter value that indicates a point along a ray at which an intersection with a second bounding region for the child node's parent node was detected. The accelerator circuitry may compare the local ray parameter value with an end ray parameter value to determine whether to traverse to the child node as part of traversal of the BVH.

19 Claims, 10 Drawing Sheets

Exit
Intersection
250

280

270  260

Entry
intersection
240
(tLocal for
boxes 220
and 230)

Child box
230

Child box
220

Parent box
210

*Triangle hit: tMax
potentially reduced*

*Example portion of bounding volume hierarchy tree*

*Example traversal stack after child tests for node 510A*

| Node information for hit child node(s) of node 510A<br>520 | T_local_A (based on intersection point with bounding region of node 510A)<br>530 |
|---|---|
| Node information for node 510N<br>540 | T_local_B (based on intersection point with bounding region of node 505)<br>550 |

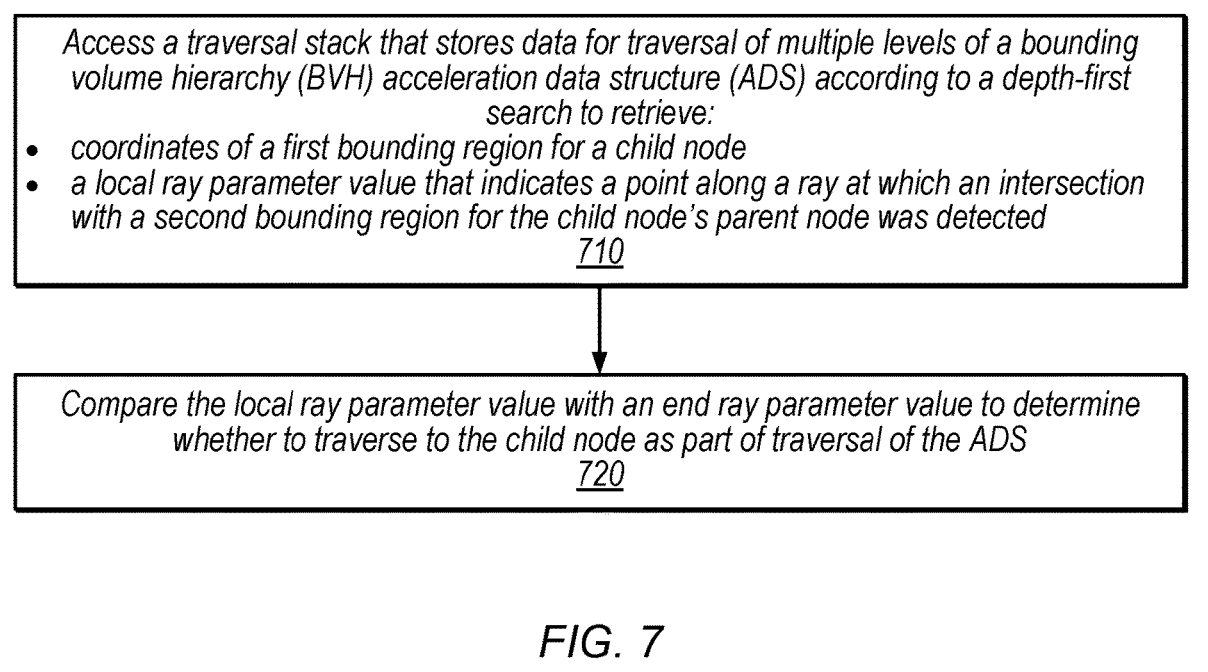

Access a traversal stack that stores data for traversal of multiple levels of a bounding volume hierarchy (BVH) acceleration data structure (ADS) according to a depth-first search to retrieve:
- coordinates of a first bounding region for a child node
- a local ray parameter value that indicates a point along a ray at which an intersection with a second bounding region for the child node's parent node was detected
710

Compare the local ray parameter value with an end ray parameter value to determine whether to traverse to the child node as part of traversal of the ADS
720

FIG. 7

PRUNING RAY TRACING TRAVERSAL OPERATIONS BASED ON LOCAL RAY PARAMETER VALUE

The present application claims priority to U.S. Provisional App. No. 63/583,920, entitled "Pruning Ray Tracing Traversal Operations based on Local Ray Parameter Value," filed Sep. 20, 2023, the disclosure of which is incorporated by reference herein in its entirety.

BACKGROUND

Technical Field

This disclosure relates generally to graphics processors and more particularly to ray tracing.

Description of Related Art

In computer graphics, ray tracing is a rendering technique for generating an image by tracing the path of light as pixels in an image plane and simulating the effects of its encounters with virtual objects. Ray tracing may allow resolution of visibility in three dimensions between any two points in the scene, which is also the source of most of its computational expense. A typical ray tracer samples paths of light through the scene in the reverse direction of light propagation, starting from the camera and propagating into the scene, rather than from the light sources (this is sometimes referred to as "backward ray tracing"). Starting from the camera has the benefit of only tracing rays which are visible to the camera. This system can model a rasterizer, in which rays simply stop at the first surface and invoke a shader (analogous to a fragment shader) to compute a color. More commonly, secondary effects—in which the exchange of illumination between scene elements, such as diffuse inter-reflection and transmission—are also modeled. Shaders that evaluate surface reflective properties may invoke further intersection queries (e.g., generate new rays) to capture incoming illumination from other surfaces. This recursive process has many formulations, but is commonly referred to as path tracing.

Graphics processors (GPUs) that implement ray tracing typically provide more realistic scenes and lighting effects, relative to traditional rasterization systems. Ray tracing is typically computationally expensive, however. Improvements to ray tracing techniques may improve realism in graphics scenes, improve performance (e.g., allow tracing of more rays per frame, tracing in more complex scenes, or both), reduce power consumption (which may be particularly important in battery-powered devices), etc.

In typical ray tracing implementations, the graphics processor traverses a bounding volume hierarchy (BVH) acceleration data structure (ADS) to determine which primitives (e.g., triangles) in a scene are to be tested for intersection with the ray. This substantially reduces the number of ray-primitive intersection tests for a given render (e.g., relative to testing every ray against every primitive). Generally, reductions in the number of bounding region intersection tests or primitive intersection tests for a given ray, while still accurately traversing the ADS, may improve performance, reduce power consumption, or both.

BRIEF DESCRIPTION OF DRAWINGS

FIG. 7 is a flow diagram illustrating an example method, according to some embodiments.

DETAILED DESCRIPTION

In disclosed embodiments, a GPU may determine to prune portions of an ADS traversal (e.g., pruning one or more bounding region/ray intersect tests). During a typical depth-first traversal of a BVH ADS, when there are hits for multiple child nodes, the traversal proceeds down the tree to one of the nodes and the rest of the child nodes are deferred and pushed on to a traversal stack. During the traversal, the end value (e.g., tMax) of the ray parametric interval may be reduced, e.g., due to a detected triangle intersection before traversal that returns to nodes on the stack.

In some cases, tMax may be reduced such that the ray cannot intersect with one or more child nodes on the stack. In that case, the GPU is configured to prune intersection tests for bounding boxes corresponding to those child nodes, in some embodiments. Detecting this situation, however, may be difficult in traditional GPUs that do not track the positioning of bounding boxes along the ray. In disclosed embodiments, however, the GPU may maintain a local ray parameter value tLocal that corresponds to the point along the ray at which the ray intersected the parent bounding box.

In some embodiments, prune control circuitry is configured to prune intersection tests for nodes whose tLocal is greater than the current ray tMax. In particular, the processor may determine not to traverse to those nodes and therefore may not test bounding regions corresponding to child nodes of those nodes. This may advantageously reduce power consumption for a given workload, improve performance by making intersect test resources available for other tests, or both.

In some embodiments, prune control circuitry is configured to check for pruning situations only for certain types of operations associated with higher resource usage, e.g., transforms for nodes such as instance nodes. Pruning a transform node may further avoid a ray transform operation associated with traversal to the transform node.

Graphics Processing Overview

Figure 1A:
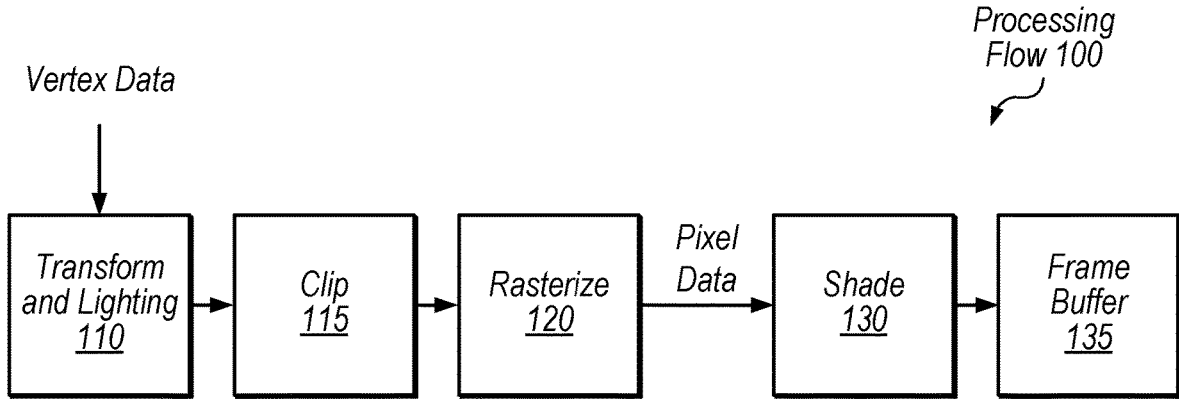
FIG. 1A is a diagram illustrating an overview of example graphics processing operations, according to some embodiments.

Referring to FIG. 1A, a flow diagram illustrating an example processing flow 100 for processing graphics data is shown. In some embodiments, transform and lighting procedure 110 may involve processing lighting information for vertices received from an application based on defined light source locations, reflectance, etc., assembling the vertices into polygons (e.g., triangles), and transforming the polygons to the correct size and orientation based on position in a three-dimensional space. Clip procedure 115 may involve discarding polygons or vertices that fall outside of a viewable area. In some embodiments, geometry processing may utilize object shaders and mesh shaders for flexibility and efficient processing prior to rasterization. Rasterize procedure 120 may involve defining fragments within each polygon and assigning initial color values for each fragment, e.g., based on texture coordinates of the vertices of the polygon. Fragments may specify attributes for pixels which they overlap, but the actual pixel attributes may be determined based on combining multiple fragments (e.g., in a frame buffer), ignoring one or more fragments (e.g., if they are covered by other objects), or both. Shade procedure 130 may involve altering pixel components based on lighting, shadows, bump mapping, translucency, etc. Shaded pixels may be assembled in a frame buffer 135. Modern GPUs typically include programmable shaders that allow customization of shading and other processing procedures by application developers. Thus, in various embodiments, the example elements of FIG. 1A may be performed in various orders, performed in parallel, or omitted. Additional processing procedures may also be implemented.

Figure 1B:
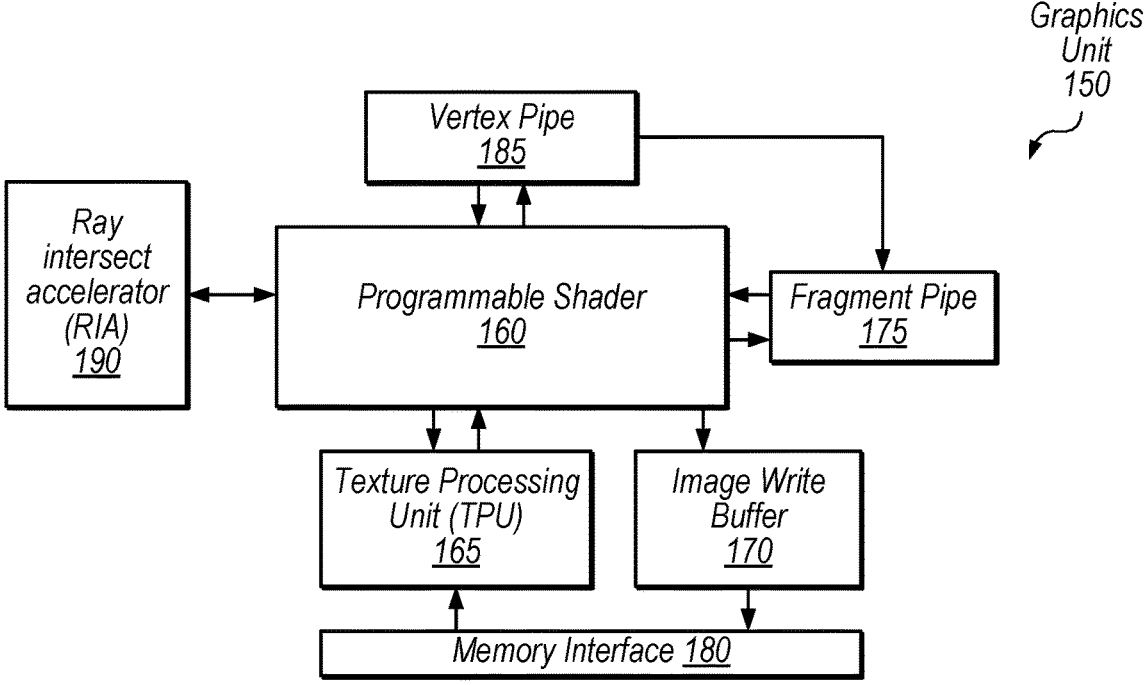
FIG. 1B is a block diagram illustrating an example graphics unit, according to some embodiments.

Referring now to FIG. 1B, a simplified block diagram illustrating a graphics unit 150 is shown, according to some embodiments. In the illustrated embodiment, graphics unit 150 includes programmable shader 160, vertex pipe 185, fragment pipe 175, texture processing unit (TPU) 165, image write buffer 170, and memory interface 180. In some embodiments, graphics unit 150 is configured to process both vertex and fragment data using programmable shader 160, which may be configured to process graphics data in parallel using multiple execution pipelines or instances.

Vertex pipe 185, in the illustrated embodiment, may include various fixed-function hardware configured to process vertex data. Vertex pipe 185 may be configured to communicate with programmable shader 160 in order to coordinate vertex processing. In the illustrated embodiment, vertex pipe 185 is configured to send processed data to fragment pipe 175 or programmable shader 160 for further processing.

Fragment pipe 175, in the illustrated embodiment, may include various fixed-function hardware configured to process pixel data. Fragment pipe 175 may be configured to communicate with programmable shader 160 in order to coordinate fragment processing. Fragment pipe 175 may be configured to perform rasterization on polygons from vertex pipe 185 or programmable shader 160 to generate fragment data. Vertex pipe 185 and fragment pipe 175 may be coupled to memory interface 180 (coupling not shown) in order to access graphics data.

Programmable shader 160, in the illustrated embodiment, is configured to receive vertex data from vertex pipe 185 and fragment data from fragment pipe 175 and TPU 165. Programmable shader 160 may be configured to perform vertex processing tasks on vertex data which may include various transformations and adjustments of vertex data. Programmable shader 160, in the illustrated embodiment, is also configured to perform fragment processing tasks on pixel data such as texturing and shading, for example. Programmable shader 160 may include multiple sets of multiple execution pipelines for processing data in parallel.

In some embodiments, programmable shader includes pipelines configured to execute one or more different SIMD groups in parallel. Each pipeline may include various stages configured to perform operations in a given clock cycle, such as fetch, decode, issue, execute, etc. The concept of a processor "pipeline" is well understood, and refers to the concept of splitting the "work" a processor performs on instructions into multiple stages. In some embodiments, instruction decode, dispatch, execution (i.e., performance), and retirement may be examples of different pipeline stages. Many different pipeline architectures are possible with varying orderings of elements/portions. Various pipeline stages perform such steps on an instruction during one or more processor clock cycles, then pass the instruction or operations associated with the instruction on to other stages for further processing.

The term "SIMD group" is intended to be interpreted according to its well-understood meaning, which includes a set of threads for which processing hardware processes the same instruction in parallel using different input data for the different threads. SIMD groups may also be referred to as SIMT (single-instruction, multiple-thread) groups, single instruction parallel thread (SIPT), or lane-stacked threads. Various types of computer processors may include sets of pipelines configured to execute SIMD instructions. For example, graphics processors often include programmable shader cores that are configured to execute instructions for a set of related threads in a SIMD fashion. Other examples of names that may be used for a SIMD group include: a wavefront, a clique, or a warp. A SIMD group may be a part of a larger threadgroup of threads that execute the same program, which may be broken up into a number of SIMD groups (within which threads may execute in lockstep) based on the parallel processing capabilities of a computer. In some embodiments, each thread is assigned to a hardware pipeline (which may be referred to as a "lane") that fetches operands for that thread and performs the specified operations in parallel with other pipelines for the set of threads. Note that processors may have a large number of pipelines such that multiple separate SIMD groups may also execute in parallel. In some embodiments, each thread has private operand storage, e.g., in a register file. Thus, a read of a particular register from the register file may provide the version of the register for each thread in a SIMD group.

As used herein, the term "thread" includes its well-understood meaning in the art and refers to sequence of program instructions that can be scheduled for execution independently of other threads. Multiple threads may be included in a SIMD group to execute in lock-step. Multiple threads may be included in a task or process (which may correspond to a computer program). Threads of a given task may or may not share resources such as registers and memory. Thus, context switches may or may not be performed when switching between threads of the same task.

In some embodiments, multiple programmable shader units 160 are included in a GPU. In these embodiments, global control circuitry may assign work to the different sub-portions of the GPU which may in turn assign work to shader cores to be processed by shader pipelines.

TPU 165, in the illustrated embodiment, is configured to schedule fragment processing tasks from programmable shader 160. In some embodiments, TPU 165 is configured to pre-fetch texture data and assign initial colors to fragments for further processing by programmable shader 160 (e.g., via memory interface 180). TPU 165 may be configured to provide fragment components in normalized integer formats or floating-point formats, for example. In some embodiments, TPU 165 is configured to provide fragments in groups of four (a "fragment quad") in a 2×2 format to be processed by a group of four execution pipelines in programmable shader 160.

Image write buffer 170, in some embodiments, is configured to store processed tiles of an image and may perform operations to a rendered image before it is transferred for display or to memory for storage. In some embodiments, graphics unit 150 is configured to perform tile-based deferred rendering (TBDR). In tile-based rendering, different portions of the screen space (e.g., squares or rectangles of pixels) may be processed separately. Memory interface 180 may facilitate communications with one or more of various memory hierarchies in various embodiments.

As discussed above, graphics processors typically include specialized circuitry configured to perform certain graphics processing operations requested by a computing system. This may include fixed-function vertex processing circuitry, pixel processing circuitry, or texture sampling circuitry, for example. Graphics processors may also execute non-graphics compute tasks that may use GPU shader cores but may not use fixed-function graphics hardware. As one example, machine learning workloads (which may include inference, training, or both) are often assigned to GPUs because of their parallel processing capabilities. Thus, compute kernels executed by the GPU may include program instructions that specify machine learning tasks such as implementing neural network layers or other aspects of machine learning models to be executed by GPU shaders. In some scenarios, non-graphics workloads may also utilize specialized graphics circuitry, e.g., for a different purpose than originally intended.

Further, various circuitry and techniques discussed herein with reference to graphics processors may be implemented in other types of processors in other embodiments. Other types of processors may include general-purpose processors such as CPUs or machine learning or artificial intelligence accelerators with specialized parallel processing capabilities. These other types of processors may not be configured to execute graphics instructions or perform graphics operations. For example, other types of processors may not include fixed-function hardware that is included in typical GPUs. Machine learning accelerators may include specialized hardware for certain operations such as implementing neural network layers or other aspects of machine learning models. Speaking generally, there may be design tradeoffs between the memory requirements, computation capabilities, power consumption, and programmability of machine learning accelerators. Therefore, different implementations may focus on different performance goals. Developers may select from among multiple potential hardware targets for a given machine learning application, e.g., from among generic processors, GPUs, and different specialized machine learning accelerators.

In the illustrated example, graphics unit 150 includes ray intersection accelerator (RIA) 190, which may include hardware configured to perform various ray intersection operations in response to instruction(s) executed by programmable shader 160, as described in detail below.

Overview of Ray Intersection Testing and Intersection Points

Figure 2:
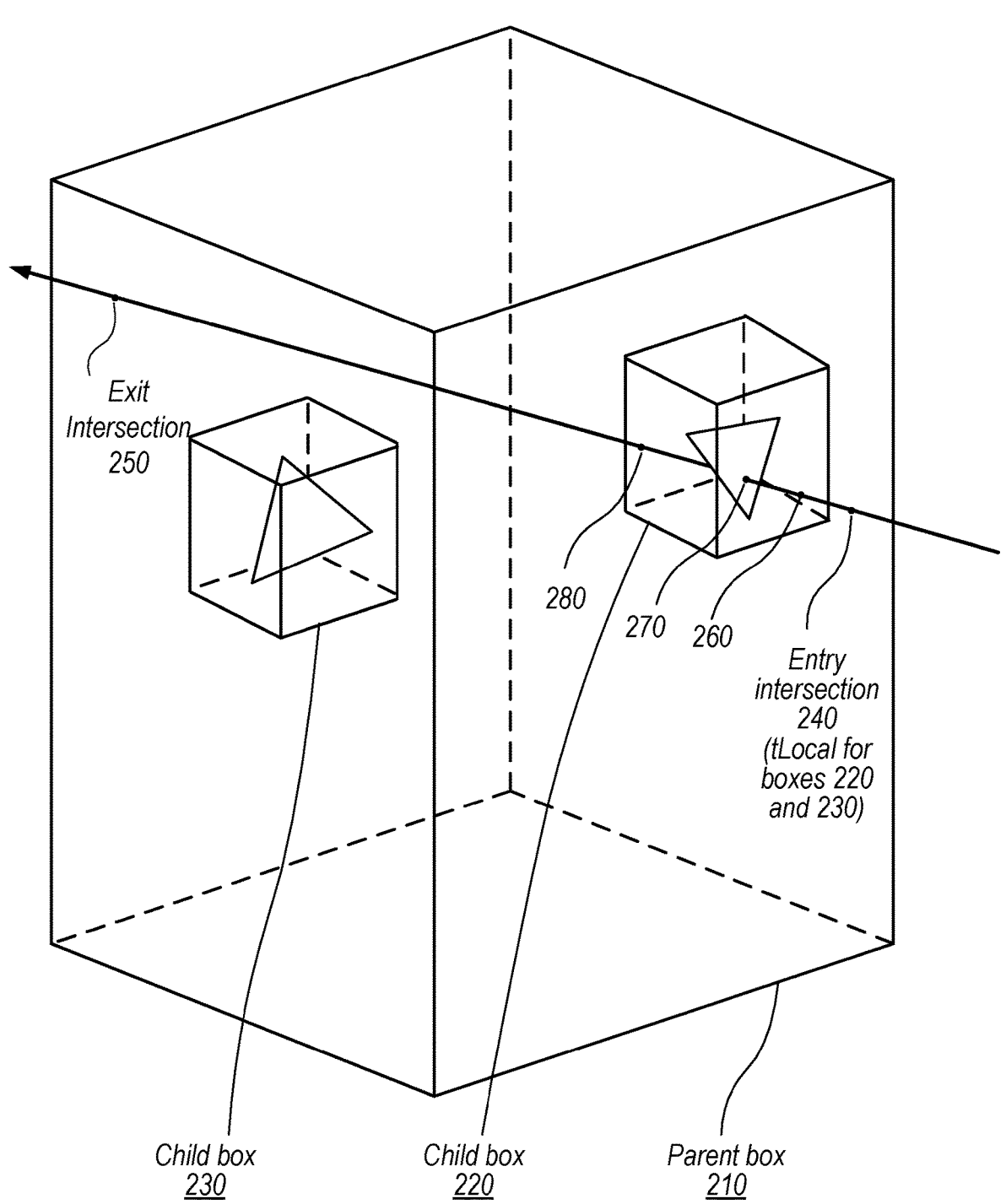
FIG. 2 is a diagram illustrating an example intersection points for a ray with bounding boxes and primitives, according to some embodiments.

FIG. 2 is a diagram illustrating example intersection points for a ray with bounding boxes and primitives, according to some embodiments. In this example, a BVH ADS for the graphics scene includes a parent bounding box 210 and two child bounding boxes 220 and 230. In this example, the child boxes each enclose a triangular primitive (although similar techniques may be used with primitives of various shapes). Note that this example is included for purposes of explanation and is not necessarily drawn to scale.

As shown, the ray in this example intersects parent box 210 at entry intersection point 240, enters child box 220 at point 260, intersects a triangular primitive at point 270, exits child box 220 at point 280, and exits parent box 210 at exit intersection point 250. For a depth-first search corresponding to this example, based on the intersection at point 240 for parent box 210, RIA 190 would perform bounding box intersection tests for its children (including boxes 220 and 230). If there were hits for multiple children in a depth-first search, RIA 190 would traverse through one of the hits and push the remaining hits onto a traversal stack, potentially coming back to the stack in certain scenarios for later tests (e.g., box tests corresponding to children of nodes on the stack).

A given ray typically has a parametric interval over which the ray is valid. This interval may be defined at one end by max parameter value tMax, which may be adjusted during traversal (e.g., based on a detected intersection with an opaque primitive). The ray parametric interval may be defined on the other end by a local parameter value tLocal. Generally, the tLocal value for an ADS node may correspond to the point at which the ray entered the bounding box of the parent node. In the example of FIG. 2, entry point 240 corresponds to the tLocal value along the ray for the child boxes 220 and 230. Example techniques for computing tLocal are discussed below with reference to FIG. 4. In some embodiments, RIA 190 is configured to include the tLocal value for a node when pushing the node onto the traversal stack. Therefore, the tLocal value is available for further computations when the node is later popped from the stack.

As discussed in detail below with reference to FIGS. 4A-4C, in certain situations the tMax may be reduced such that a node popped from the stack has a box that is further away than the ray end point indicated by tMax (this may be determined by comparing tMax and tLocal). In this case, bounding box tests for that node cannot result in a hit and RIA 190 may prune the corresponding intersection tests. This may advantageously reduce power consumption by reducing intersect tests for ADS traversal for a given ray and may also improve performance by allowing other box tests to proceed sooner.

In some embodiments, prune control circuitry is configured to compare tMax and tLocal for only certain types of operations (e.g., associated with certain types of nodes). For example, transform nodes such as instance nodes may cause a ray transform operation. These transform operations typically include floating-point matrix multiply operations (e.g., based on a 4×4 transform matrix), which may utilize substantial processing resources. Therefore, prune checks for these types of nodes may be particularly desirable. In other embodiments, prune control circuitry is configured to compare tMax and tLocal for all nodes popped from the traversal stack.

Example Pruning Situations

Figure 3A:
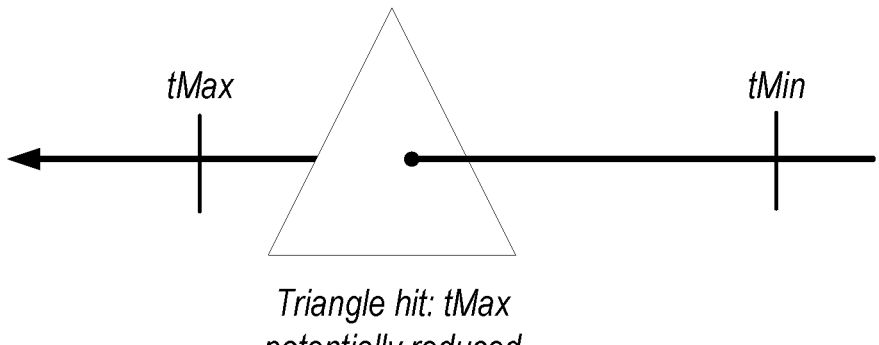
FIGS. 3A-3C are diagrams illustrating example changes in a local ray parameter value (tLocal) and a max ray parameter value (tMax) for a ray in the context of potential pruning of traversal operations, according to some embodiments.

FIG. 3A is a diagram illustrating an example ray/primitive intersection, according to some embodiments. In the illustrated example, tMax and tMin are shown prior to detecting the intersection with the illustrated triangular primitive.

Figure 3B:
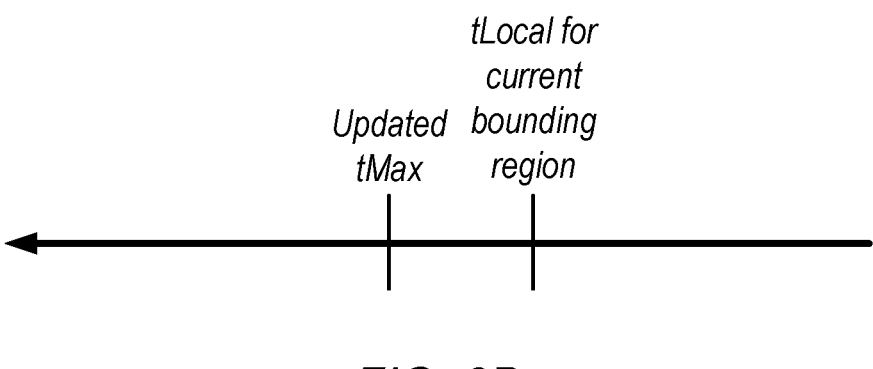

As shown in FIG. 3B, the intersection may cause RIA 190 to update tMax for the ray to correspond to the point along the ray at which the intersection occurred. FIG. 3B also shows an update in tLocal for the current bounding region (e.g., the point along the ray at which it intersected the parent bounding region).

Figure 3C:
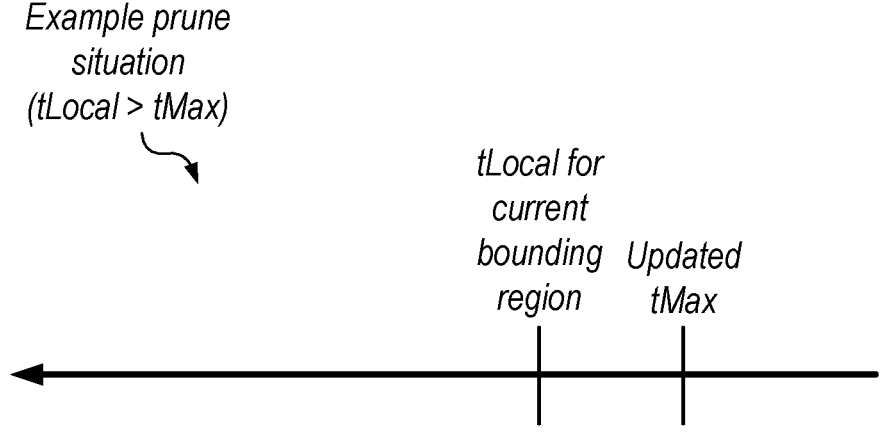

As shown in FIG. 3C, eventually the tLocal for a given ADS node on the traversal stack for the ray, tMax for the ray, or both may be adjusted such that tLocal is greater than tMax. In this situation, pruning circuitry may determine not pseudocode for a RayBoxIntersection represents operations for a generic ray-box intersection test that may be performed by a shader or by dedicated box test hardware. In some embodiments, the tEntry floating-point value corresponds to tLocal and may be pushed on to stack 420 for one or more child nodes. Note that tLocal may be quantized, e.g., as a floating-point value with a smaller number of bits than an original representation, as a fixed-point number, etc. Similar techniques may be used to store a ray parameter value corresponding to the entry intersection point in various bounding region test implementations.

```
bool RayBoxIntersection (const Ray& ray, const AABBox3f& box, float * tEntry) {
    auto t0 = 0.0f;
    auto t1 = ray.tmax;
    for (int i = 0; i < 3; ++i) {
        auto tNear = (box.lower[i] − ray.origin[i]) / ray.direction[i];
        auto tFar = (box.upper[i] − ray.origin[i]) / ray.direction[i];
        // Swap near/far if they are inverted (which is the case if ray.direction < +0.0)
        auto tNearest = tNear > tFar ? tFar : tNear;
        auto tFurthest = tNear > tFar ? tNear : tFar;
        t0 = tNearest > t0 ? tNearest : t0;
        t1 = tFurthest < t1 ? tFurthest : t1;
        if (t0 > t1) return false;
    }
    if (tEntry) *tEntry = t0;
    return true;
}
``` to traverse to the node and may not perform bounding box tests for any children of the node.

Note that one form of pruning involves re-doing a box test for a parent node in response to a primitive hit that updates tMax (where the box test redo uses the updated tMax). This approach may provide even more pruning at the cost of an extra node test.

Example Pruning Techniques

Figure 4:
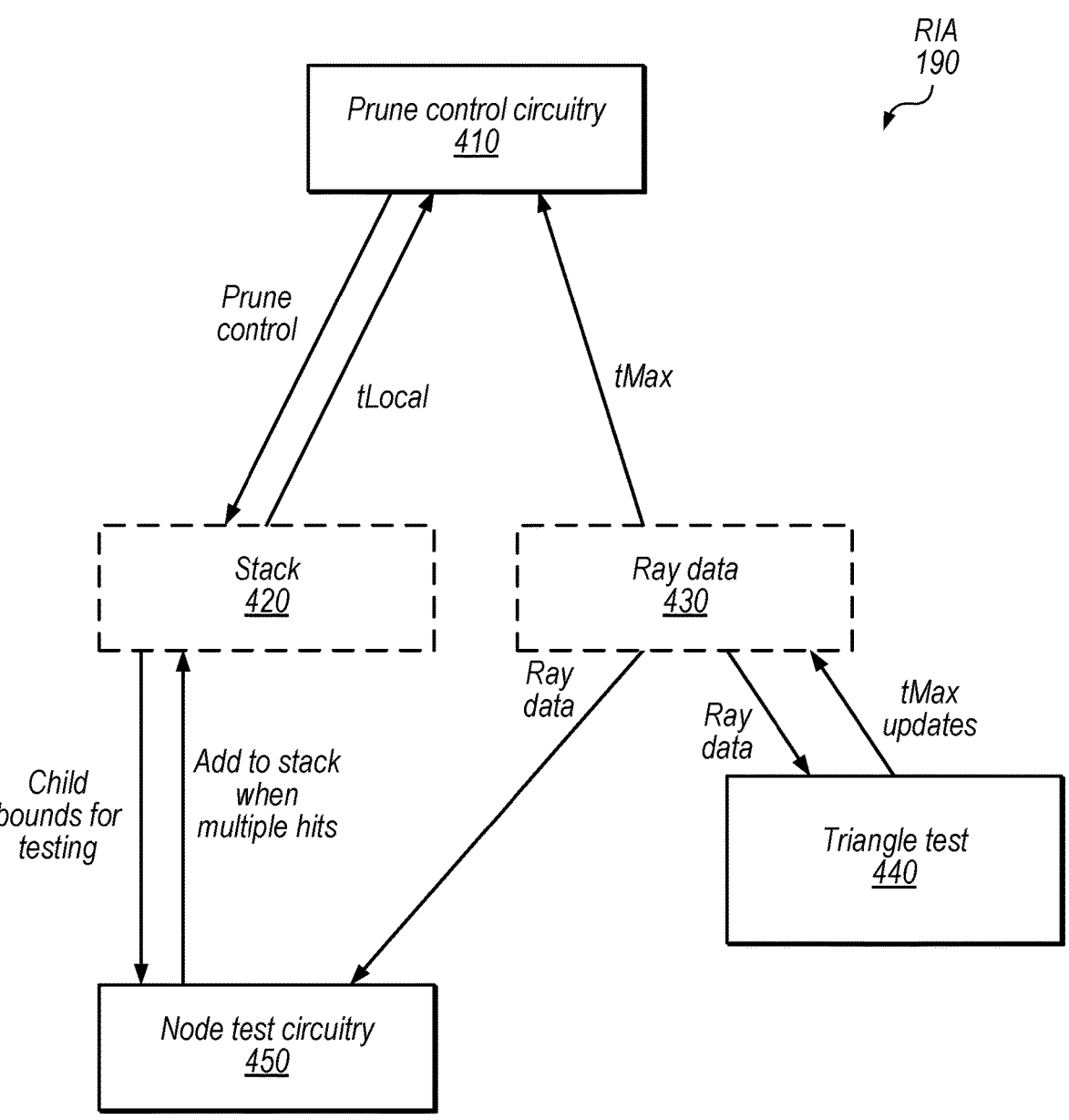
FIG. 4 is a block diagram illustrating example prune control circuitry, according to some embodiments.

FIG. 4 is a block diagram illustrating example prune control circuitry, according to some embodiments. In the illustrated example, RIA 190 includes prune control circuitry 410, circuitry that implements a stack 420, circuitry configured to store ray data 430 (e.g., a ray data cache), triangle test circuitry 440, and node test circuitry 450. Stack 420 and ray data 430 are shown using dashed lines to indicate that they are data structures maintained by circuitry of RIA 190. As discussed in detail below, prune control circuitry may prune traversal operations based on tLocal values from stack 420.

Node test circuitry 450, in some embodiments, is configured to perform slab tests to test for intersections, e.g., between bounding boxes and rays. Circuitry 450 may perform slab tests for example, and may be configured to perform intersect tests for multiple child nodes of a given node in parallel. Node test circuitry 450 receives child bounds from stack 420 and ray data from ray data 430 as inputs to the intersection tests. When there are hits for multiple child nodes, node test circuitry 450 adds one or more child nodes to the stack for potential later traversal. In some embodiments, node test circuitry 450 stores the tLocal value when pushing node(s) onto the stack 420.

In some embodiments, node test circuitry 450 is configured to determine tLocal based on an intermediate parameter from the bounding region test. For example, the following Stack 420, in some embodiments, is implemented in a shader core memory space for a given ray and stack data may be stored in one or more caches. As shown, stack 420 provides a tLocal value to prune control circuitry 410 and receives a prune control signal from prune control circuitry 410 (which may indicate to discard one or more entries from stack 420).

During depth-first traversal while nodes are waiting on stack 420, triangle test circuitry 440 may perform ray/triangle intersection tests. Note that triangle test circuitry 440 may be accelerator circuitry, a shader core configured to execute a triangle test program, or some combination thereof. Circuitry 440 may receive primitive data (not shown) based on leaf nodes of the ADS and ray data from ray data 430 for intersection tests. Based on an intersection test, circuitry 440 may update the tMax for a given ray (e.g., to reduce tMax based on certain types of intersections).

Prune control circuitry 410, in some embodiments, is configured to perform a prune check for one or more entries in stack 420. As shown, prune control circuitry 410 is configured to receive tLocal from stack 420 and tMax from ray data 430. In certain situations (e.g., when tLocal is greater than tMax), prune control circuitry may avoid traversal to the corresponding node (e.g., by removing the node from the stack, which may avoid intersection tests for that node, avoid performing a ray transform if the node is a transform node, or both). Prune control circuitry 410 may utilize various appropriate implementations of comparison circuitry to compare tLocal and tMax values, e.g., depending on the encodings, number of bits, etc. used for those values, design tradeoffs between area, power, and performance for comparator topologies, etc.

Note that various disclosed embodiments utilize depth-first ADS traversal and a corresponding stack. These implementations are included for purposes of explanation but are not intended to limit the scope of the present disclosure. Other data structures and other traversal patterns may be utilized in other embodiments, and prune control circuitry 410 may be configured to prune tests for deferred nodes in those embodiments.

Note that "instancing" is a common graphics technique in which parameters for an object or mesh are defined once and then instantiated multiple times in a graphics scene. Rather than including each instance of the object in the ADS for ray tracing, an instanced object typically may have one "instance sub-tree" in the ADS. On reaching an instance node (the origin of an instance sub-tree), the GPU may transform the ray from world space to an instance space of a specific instance for further traversal. This may substantially reduce the size of the ADS (relative to replicating the sub-tree at different locations in the ADS for different instances), with the tradeoff that the ray transform may utilize processing resources.

In some embodiments, prune control circuitry 410 is configured to perform prune checks for only certain types of nodes, e.g., for instance nodes.

Figures 5A, 5B:
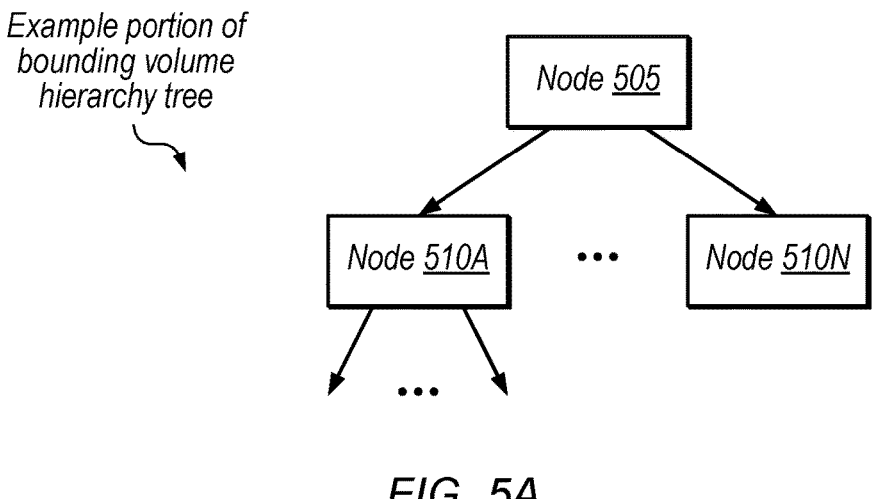
FIG. 5A is a diagram illustrating an example portion of the bounding volume hierarchy tree, according to some embodiments.
FIG. 5B is a diagram illustrating example contents of a traversal stack during traversal of the tree of FIG. 5A, including tLocal values, according to some embodiments.

FIG. 5A is a diagram illustrating an example portion of a bounding volume hierarchy tree, according to some embodiments. In the illustrated example, node 505 is a parent node to N child nodes 510A-510N.

FIG. 5B is a diagram illustrating example contents of a traversal stack during traversal of the tree of FIG. 5A, including tLocal values, according to some embodiments. In the illustrated example, a ray intersected with both nodes 510A and 510N and multiple children of node 510A. In this example, traversal has continued past node 510A but has not reached any children of node 510N.

In the illustrated example, the first entry (the top row in the table) is for one or more hit child nodes of node 510A that have not yet been traversed. Along with node information 520 for these nodes (e.g., child bounds), the traversal stack includes a tLocal value T_local_A 530 which is based on the intersection point with the bounding region corresponding to node 510A. Similarly, the next entry on the traversal stack is for node 510N. Along with the node information 540 for node 510N, the traversal stack includes tLocal value T_local_B 550 which is based on the intersection point with the bounding region of node 505.

In this manner, the tLocal value may be stored in the traversal stack with the appropriate nodes. Note that the tLocal value may be quantized, in some embodiments. For example, various BVH data may be quantized, such as bounding box boundaries. Therefore, the tLocal value may be the result of computations on quantized values. Further, the tLocal value itself may be quantized after it is initially determined. The quantization may be conservative such that the quantization never causes tLocal to be greater than tMax when this is not the case for the non-quantized representations. Generally, tLocal may be represented using a smaller number of bits than ray coordinates. For example, a ray may be represented using X, Y, and Z origin coordinates and X, Y, and Z components to a direction, e.g., which may be represented using 16-bit or 32-bit floating-point values. In this example, a quantized tLocal value may be represented using a 6, 8, or 10-bit floating-point or fixed-point value.

Example Methods

Figure 6:
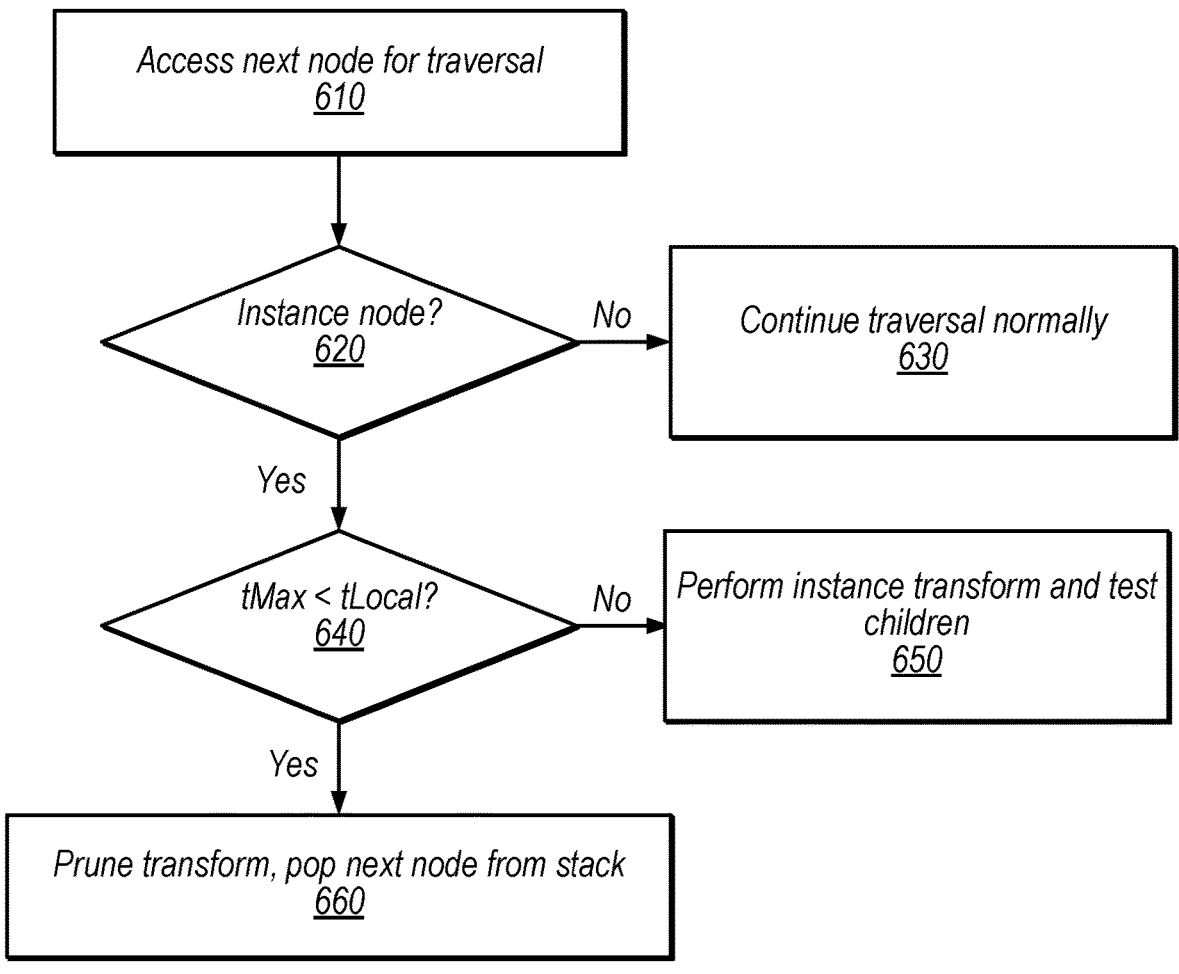
FIG. 6 is a flow diagram illustrating example prune techniques, according to some embodiments.

FIG. 6 is a flow diagram illustrating an example pruning technique for instance nodes, according to some embodiments. At 610, in the illustrated embodiment, RIA 190 accesses the next node for traversal for a given ray (e.g., from the ray's traversal stack 420). At 620, RIA 190 determines whether the node is an instance node. If not, flow proceeds to 630 and RIA 190 continues traversal normally. If the node is an instance node, flow proceeds to 640 and prune control circuitry 410 determines whether tMax is smaller than tLocal. If so, prune control circuitry 410 prunes the transform (such that the instance transform for the ray is not performed) and RIA 190 pops the next node from the traversal stack at 660. If tMax is not smaller than tLocal, flow proceeds to 650 and RIA 190 performs the instance transform (e.g., using a transform shader or transform accelerator hardware) and proceeds to perform bounding box intersection tests for children of the node accessed at 610.

As discussed above, in other embodiments prune control circuitry 410 is configured to perform prune tests for all ADS nodes prior to traversal to those nodes.

FIG. 7 is a flow diagram illustrating an example method, according to some embodiments. The method shown in FIG. 7 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 710, in the illustrated embodiment, a graphics processor accesses (e.g., using RIA 190) a traversal stack that stores data for traversal of multiple levels of a BVH ADS according to a depth-first search to retrieve: coordinates of a first bounding region for a child node (e.g., quantized X, Y, and Z values for two opposite corners of a bounding box) and a local ray parameter value (e.g., tLocal) that indicates a point along a ray at which an intersection with a second bounding region for the child node's parent node was detected (or more generally, a second bounding region for a point along a ray at which an intersection with a second bounding region for an ancestor node of child node was detected).

In some embodiments, the processor generates the local ray parameter value based on a determined entry intersection point between the ray and the second bounding region and writes the coordinates and the local ray parameter value to the traversal stack in response to detecting intersections for multiple child nodes of the parent node. In some embodiments, the ray intersect accelerator circuitry is configured to generate the local ray parameter value based on an intermediate value that is computed as part of a bounding region intersection test and the local ray parameter value is encoded using a smaller number of bits than coordinates of the ray.

At 720, in the illustrated embodiment, the graphics processor compares (e.g., using prune control circuitry 410) the local ray parameter value with an end ray parameter value (e.g., tMax) to determine whether to traverse to the child node as part of traversal of the ADS. In some embodiments, the graphics processor is configured not to traverse to the node corresponding to the child node in response to the local ray parameter value being greater than the end ray parameter value.

Note that, prior to accessing the traversal stack, the processor may perform one or more primitive tests based on traversal past a sibling node of the child node and update the end ray parameter value based on the one or more primitive tests. This update may cause a situation where the local ray parameter value is greater than the end ray parameter value.

In some embodiments, storage circuitry (e.g., a ray data cache) is configured to store the coordinates of the ray and a current end ray parameter value for the ray.

In some embodiments, the ADS includes transform nodes, including the child node and the apparatus (e.g., via a shader program or dedicated ray transform circuitry) is configured to transform ray coordinates in conjunction with traversing to transform nodes. Therefore the apparatus may be configured, in response to determining not to traverse to the child node, not to transform ray coordinates for the child node. In some embodiments, the ADS includes transform nodes, the apparatus is configured to transform ray coordinates in conjunction with traversing to transform nodes, and the ray intersect accelerator circuitry is configured to perform the comparison of the local ray parameter value with an end ray parameter value to determine whether to traverse to transform nodes and configured not to perform the comparison for non-transform nodes.

In some embodiments, the graphics processor traverses the ADS based on the determination to generate intersection results for the ray. The intersection results may indicate a set of one or more primitives to test for intersection or primitive test results, for example. The graphics processor may then adjust attributes of objects in the graphics scene based on detected intersections with the ray.

Example Device

Figure 8:
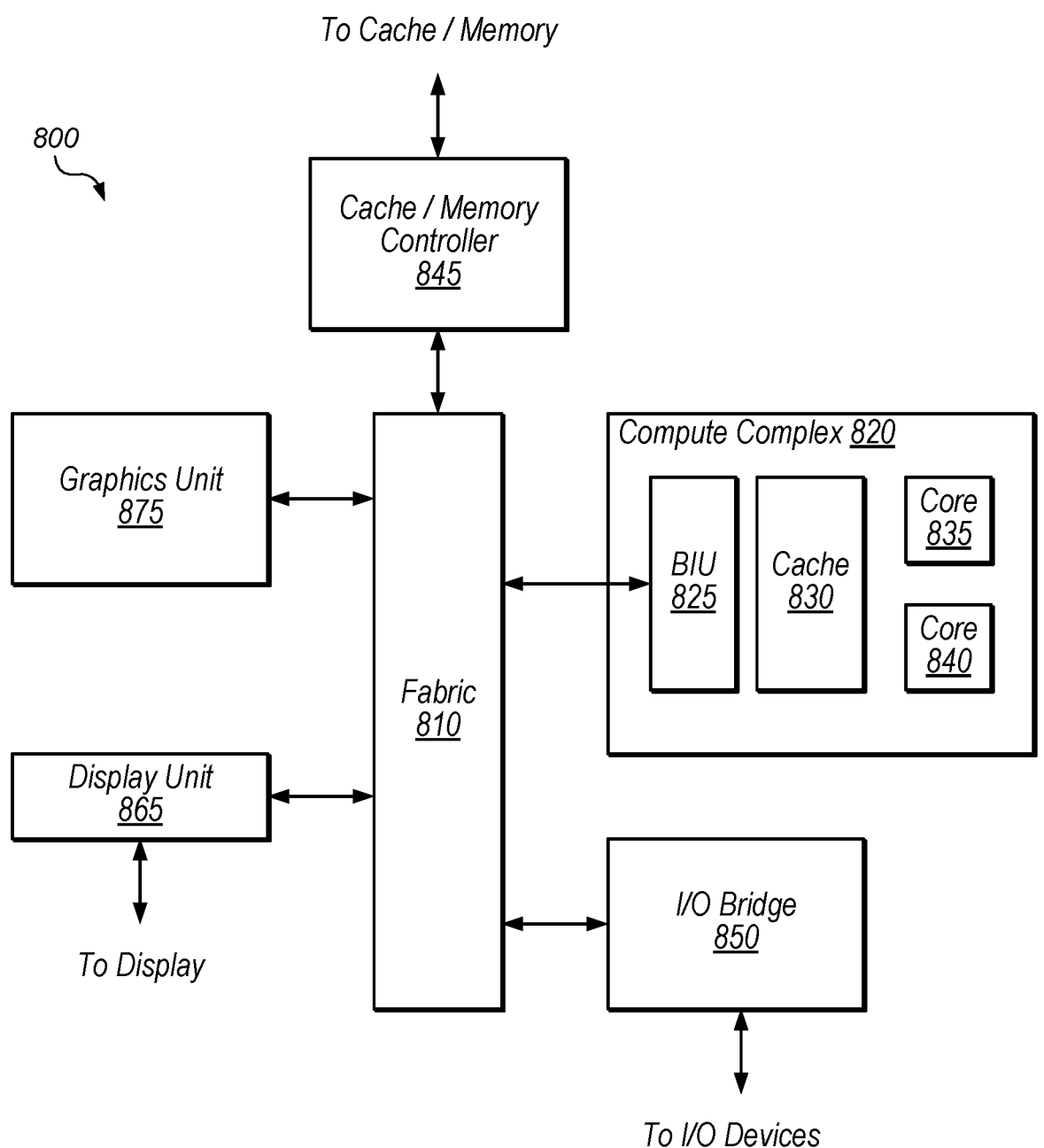
FIG. 8 is a block diagram illustrating an example computing device, according to some embodiments.

Referring now to FIG. 8, a block diagram illustrating an example embodiment of a device 800 is shown. In some embodiments, elements of device 800 may be included within a system on a chip. In some embodiments, device 800 may be included in a mobile device, which may be battery-powered. Therefore, power consumption by device 800 may be an important design consideration. In the illustrated embodiment, device 800 includes fabric 810, compute complex 820 input/output (I/O) bridge 850, cache/memory controller 845, graphics unit 875, and display unit 865. In some embodiments, device 800 may include other components (not shown) in addition to or in place of the illustrated components, such as video processor encoders and decoders, image processing or recognition elements, computer vision elements, etc.

Fabric 810 may include various interconnects, buses, MUX's, controllers, etc., and may be configured to facilitate communication between various elements of device 800. In some embodiments, portions of fabric 810 may be configured to implement various different communication protocols. In other embodiments, fabric 810 may implement a single communication protocol and elements coupled to fabric 810 may convert from the single communication protocol to other communication protocols internally.

In the illustrated embodiment, compute complex 820 includes bus interface unit (BIU) 825, cache 830, and cores 835 and 840. In various embodiments, compute complex 820 may include various numbers of processors, processor cores and caches. For example, compute complex 820 may include 1, 2, or 4 processor cores, or any other suitable number. In one embodiment, cache 830 is a set associative L2 cache. In some embodiments, cores 835 and 840 may include internal instruction and data caches. In some embodiments, a coherency unit (not shown) in fabric 810, cache 830, or elsewhere in device 800 may be configured to maintain coherency between various caches of device 800. BIU 825 may be configured to manage communication between compute complex 820 and other elements of device 800. Processor cores such as cores 835 and 840 may be configured to execute instructions of a particular instruction set architecture (ISA) which may include operating system instructions and user application instructions. These instructions may be stored in computer readable medium such as a memory coupled to memory controller 845 discussed below.

As used herein, the term "coupled to" may indicate one or more connections between elements, and a coupling may include intervening elements. For example, in FIG. 8, graphics unit 875 may be described as "coupled to" a memory through fabric 810 and cache/memory controller 845. In contrast, in the illustrated embodiment of FIG. 8, graphics unit 875 is "directly coupled" to fabric 810 because there are no intervening elements.

Cache/memory controller 845 may be configured to manage transfer of data between fabric 810 and one or more caches and memories. For example, cache/memory controller 845 may be coupled to an L3 cache, which may in turn be coupled to a system memory. In other embodiments, cache/memory controller 845 may be directly coupled to a memory. In some embodiments, cache/memory controller 845 may include one or more internal caches. Memory coupled to controller 845 may be any type of volatile memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR4, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit in a chip-on-chip configuration, a package-on-package configuration, or a multi-chip module configuration. Memory coupled to controller 845 may be any type of non-volatile memory such as NAND flash memory, NOR flash memory, nano RAM (NRAM), magneto-resistive RAM (MRAM), phase change RAM (PRAM), Racetrack memory, Memristor memory, etc. As noted above, this memory may store program instructions executable by compute complex 820 to cause the computing device to perform functionality described herein.

Graphics unit 875 may include one or more processors, e.g., one or more graphics processing units (GPUs). Graphics unit 875 may receive graphics-oriented instructions, such as OPENGL®, Metal®, or DIRECT3D® instructions, for example. Graphics unit 875 may execute specialized GPU instructions or perform other operations based on the received graphics-oriented instructions. Graphics unit 875 may generally be configured to process large blocks of data in parallel and may build images in a frame buffer for output to a display, which may be included in the device or may be a separate device. Graphics unit 875 may include transform, lighting, triangle, and rendering engines in one or more graphics processing pipelines. Graphics unit 875 may output pixel information for display images. Graphics unit 875, in various embodiments, may include programmable shader circuitry which may include highly parallel execution cores configured to execute graphics programs, which may include pixel tasks, vertex tasks, and compute tasks (which may or may not be graphics-related).

In some embodiments, disclosed techniques advantageously reduce ray transform operations, intersection tests, or both, which may improve performance, reduce power consumption, or both for graphics unit 875. For example, graphics unit 857 may provide a similar frame rate and graphical quality to traditional implementations at a lower power consumption, or provide greater frame rate, graphical quality, or both, at a given power consumption level.

Display unit 865 may be configured to read data from a frame buffer and provide a stream of pixel values for display. Display unit 865 may be configured as a display pipeline in some embodiments. Additionally, display unit 865 may be configured to blend multiple frames to produce an output frame. Further, display unit 865 may include one or more interfaces (e.g., MIPI® or embedded display port (eDP)) for coupling to a user display (e.g., a touchscreen or an external display).

I/O bridge 850 may include various elements configured to implement: universal serial bus (USB) communications, security, audio, and low-power always-on functionality, for example. I/O bridge 850 may also include interfaces such as pulse-width modulation (PWM), general-purpose input/output (GPIO), serial peripheral interface (SPI), and inter-integrated circuit (I2C), for example. Various types of peripherals and devices may be coupled to device 800 via I/O bridge 850.

In some embodiments, device 800 includes network interface circuitry (not explicitly shown), which may be connected to fabric 810 or I/O bridge 850. The network interface circuitry may be configured to communicate via various networks, which may be wired, wireless, or both. For example, the network interface circuitry may be configured to communicate via a wired local area network, a wireless local area network (e.g., via Wi-Fi™), or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth® or Wi-Fi™ Direct), etc. In various embodiments, the network interface circuitry may provide device 800 with connectivity to various types of other devices and networks.

Example Applications

Figure 9:
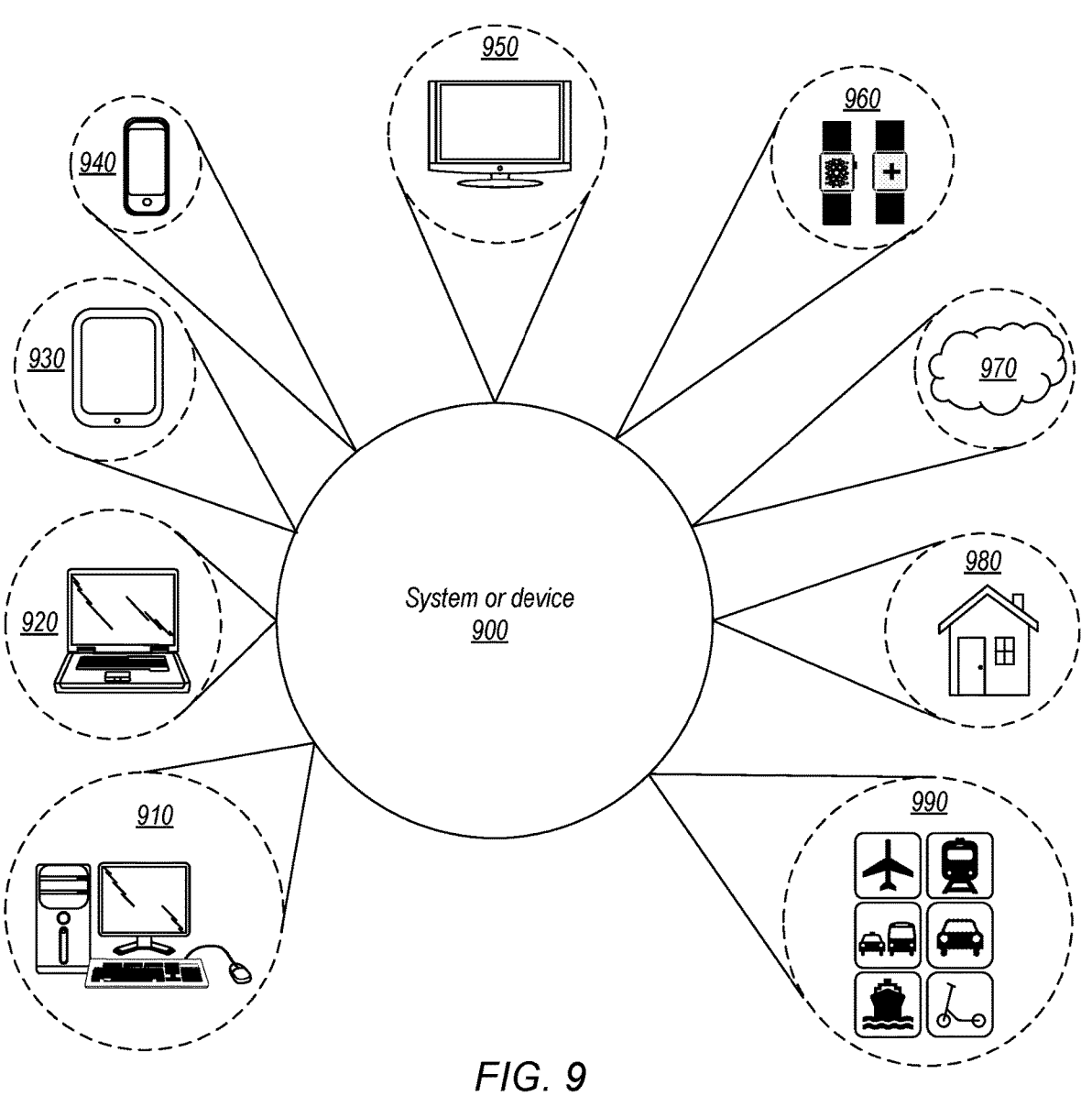
FIG. 9 is a diagram illustrating example applications of disclosed systems and devices, according to some embodiments.

Turning now to FIG. 9, various types of systems that may include any of the circuits, devices, or system discussed above. System or device 900, which may incorporate or otherwise utilize one or more of the techniques described herein, may be utilized in a wide range of areas. For example, system or device 900 may be utilized as part of the hardware of systems such as a desktop computer 910, laptop computer 920, tablet computer 930, cellular or mobile phone 940, or television 950 (or set-top box coupled to a television).

Similarly, disclosed elements may be utilized in a wearable device 960, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 900 may also be used in various other contexts. For example, system or device 900 may be utilized in the context of a server computer system, such as a dedicated server or on shared hardware that implements a cloud-based service 970. Still further, system or device 900 may be implemented in a wide range of specialized everyday devices, including devices 980 commonly found in the home such as refrigerators, thermostats, security cameras, etc. The interconnection of such devices is often referred to as the "Internet of Things" (IoT). Elements may also be implemented in various modes of transportation. For example, system or device 900 could be employed in the control systems, guidance systems, entertainment systems, etc. of various types of vehicles 990.

The applications illustrated in FIG. 9 are merely exemplary and are not intended to limit the potential future applications of disclosed systems or devices. Other example applications include, without limitation: portable gaming devices, music players, data storage devices, unmanned aerial vehicles, etc.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that programs a computing system to generate a simulation model of the hardware circuit, programs a fabrication system configured to produce hardware (e.g., an integrated circuit) that includes the disclosed circuitry, etc. Claims to such a storage medium are intended to cover, for example, an entity that produces a circuit design, but does not itself perform complete operations such as: design simulation, design synthesis, circuit fabrication, etc.

Figure 10:
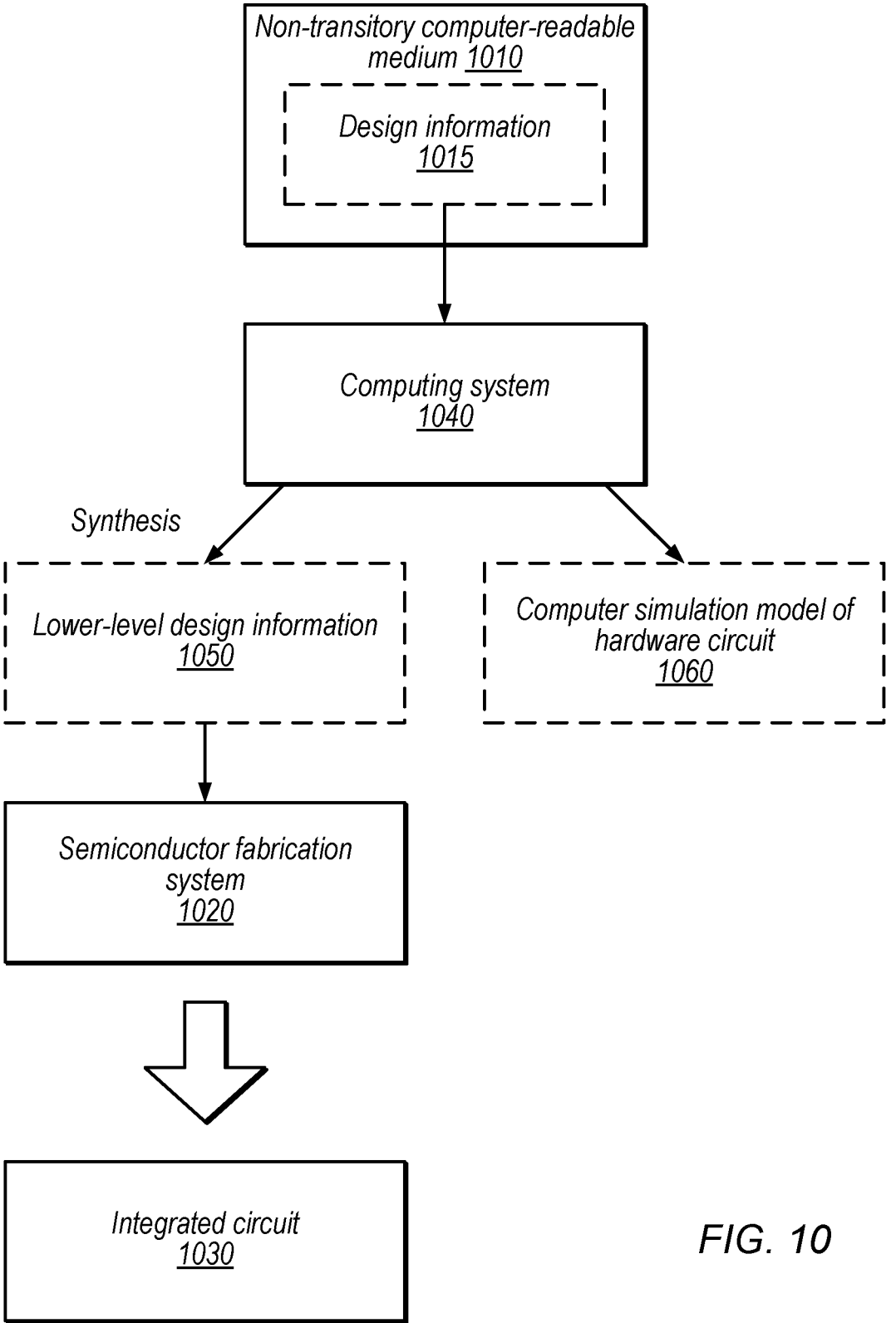
FIG. 10 is a block diagram illustrating an example computer-readable medium that stores circuit design information, according to some embodiments.

FIG. 10 is a block diagram illustrating an example non-transitory computer-readable storage medium that stores circuit design information, according to some embodiments. In the illustrated embodiment, computing system 1040 is configured to process the design information. This may include executing instructions included in the design information, interpreting instructions included in the design information, compiling, transforming, or otherwise updating the design information, etc. Therefore, the design information controls computing system 1040 (e.g., by programming computing system 1040) to perform various operations discussed below, in some embodiments.

In the illustrated example, computing system 1040 processes the design information to generate both a computer simulation model of a hardware circuit 1060 and lower-level design information 1050. In other embodiments, computing system 1040 may generate only one of these outputs, may generate other outputs based on the design information, or both. Regarding the computing simulation, computing system 1040 may execute instructions of a hardware description language that includes register transfer level (RTL) code, behavioral code, structural code, or some combination thereof. The simulation model may perform the functionality specified by the design information, facilitate verification of the functional correctness of the hardware design, generate power consumption estimates, generate timing estimates, etc.

In the illustrated example, computing system 1040 also processes the design information to generate lower-level design information 1050 (e.g., gate-level design information, a netlist, etc.). This may include synthesis operations, as shown, such as constructing a multi-level network, optimizing the network using technology-independent techniques, technology dependent techniques, or both, and outputting a network of gates (with potential constraints based on available gates in a technology library, sizing, delay, power, etc.). Based on lower-level design information 1050 (potentially among other inputs), semiconductor fabrication system 1020 is configured to fabricate an integrated circuit 1030 (which may correspond to functionality of the simulation model 1060). Note that computing system 1040 may generate different simulation models based on design information at various levels of description, including information 1050, 1015, and so on. The data representing design information 1050 and model 1060 may be stored on medium 1010 or on one or more other media.

In some embodiments, the lower-level design information 1050 controls (e.g., programs) the semiconductor fabrication system 1020 to fabricate the integrated circuit 1030. Thus, when processed by the fabrication system, the design information may program the fabrication system to fabricate a circuit that includes various circuitry disclosed herein.

Non-transitory computer-readable storage medium 1010, may comprise any of various appropriate types of memory devices or storage devices. Non-transitory computer-readable storage medium 1010 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 1010 may include other types of non-transitory memory as well or combinations thereof. Accordingly, non-transitory computer-readable storage medium 1010 may include two or more memory media; such media may reside in different locations—for example, in different computer systems that are connected over a network.

Design information 1015 may be specified using any of various appropriate computer languages, including hardware description languages such as, without limitation: VHDL, Verilog, SystemC, System Verilog, RHDL, M, MyHDL, etc. The format of various design information may be recognized by one or more applications executed by computing system 1040, semiconductor fabrication system 1020, or both. In some embodiments, design information may also include one or more cell libraries that specify the synthesis, layout, or both of integrated circuit 1030. In some embodiments, the design information is specified in whole or in part in the form of a netlist that specifies cell library elements and their connectivity. Design information discussed herein, taken alone, may or may not include sufficient information for fabrication of a corresponding integrated circuit. For example, design information may specify the circuit elements to be fabricated but not their physical layout. In this case, design information may be combined with layout information to actually fabricate the specified circuitry.

Integrated circuit 1030 may, in various embodiments, include one or more custom macrocells, such as memories, analog or mixed-signal circuits, and the like. In such cases, design information may include information related to included macrocells. Such information may include, without limitation, schematics capture database, mask design data, behavioral models, and device or transistor level netlists. Mask design data may be formatted according to graphic data system (GDSII), or any other suitable format.

Semiconductor fabrication system 1020 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1020 may also be configured to perform various testing of fabricated circuits for correct operation.

In various embodiments, integrated circuit 1030 and model 1060 are configured to operate according to a circuit design specified by design information 1015, which may include performing any of the functionality described herein. For example, integrated circuit 1030 may include any of various elements shown in FIGS. 1B, 4, and 8. Further, integrated circuit 1030 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components. Similarly, stating "instructions of a hardware description programming language" that are "executable" to program a computing system to generate a computer simulation model" does not imply that the instructions must be executed in order for the element to be met, but rather specifies characteristics of the instructions. Additional features relating to the model (or the circuit represented by the model) may similarly relate to characteristics of the instructions, in this context. Therefore, an entity that sells a computer-readable medium with instructions that satisfy recited characteristics may provide an infringing product, even if another entity actually executes the instructions on the medium.

Note that a given design, at least in the digital logic context, may be implemented using a multitude of different gate arrangements, circuit technologies, etc. As one example, different designs may select or connect gates based on design tradeoffs (e.g., to focus on power consumption, performance, circuit area, etc.). Further, different manufacturers may have proprietary libraries, gate designs, physical gate implementations, etc. Different entities may also use different tools to process design information at various layers (e.g., from behavioral specifications to physical layout of gates).

Once a digital logic design is specified, however, those skilled in the art need not perform substantial experimentation or research to determine those implementations. Rather, those of skill in the art understand procedures to reliably and predictably produce one or more circuit implementations that provide the function described by the design information. The different circuit implementations may affect the performance, area, power consumption, etc. of a given design (potentially with tradeoffs between different design goals), but the logical function does not vary among the different circuit implementations of the same circuit design.

In some embodiments, the instructions included in the design information instructions provide RTL information (or other higher-level design information) and are executable by the computing system to synthesize a gate-level netlist that represents the hardware circuit based on the RTL information as an input. Similarly, the instructions may provide behavioral information and be executable by the computing system to synthesize a netlist or other lower-level design information. The lower-level design information may program fabrication system 1020 to fabricate integrated circuit 1030.

The various techniques described herein may be performed by one or more computer programs. The term "program" is to be construed broadly to cover a sequence of instructions in a programming language that a computing device can execute. These programs may be written in any suitable computer language, including lower-level languages such as assembly and higher-level languages such as Python. The program may be written in a compiled language such as C or C++, or an interpreted language such as JavaScript.

Program instructions may be stored on a "computer-readable storage medium" or a "computer-readable medium" in order to facilitate execution of the program instructions by a computer system. Generally speaking, these phrases include any tangible or non-transitory storage or memory medium. The terms "tangible" and "non-transitory" are intended to exclude propagating electromagnetic signals, but not to otherwise limit the type of storage medium. Accordingly, the phrases "computer-readable storage medium" or a "computer-readable medium" are intended to cover types of storage devices that do not necessarily store information permanently (e.g., random access memory (RAM)). The term "non-transitory," accordingly, is a limitation on the nature of the medium itself (i.e., the medium cannot be a signal) as opposed to a limitation on data storage persistency of the medium (e.g., RAM vs. ROM).

The phrases "computer-readable storage medium" and "computer-readable medium" are intended to refer to both a storage medium within a computer system as well as a removable medium such as a CD-ROM, memory stick, or portable hard drive. The phrases cover any type of volatile memory within a computer system including DRAM, DDR RAM, SRAM, EDO RAM, Rambus RAM, etc., as well as non-volatile memory such as magnetic media, e.g., a hard drive, or optical storage. The phrases are explicitly intended to cover the memory of a server that facilitates downloading of program instructions, the memories within any intermediate computer system involved in the download, as well as the memories of all destination computing devices. Still further, the phrases are intended to cover combinations of different types of memories.

In addition, a computer-readable medium or storage medium may be located in a first set of one or more computer systems in which the programs are executed, as well as in a second set of one or more computer systems which connect to the first set over a network. In the latter instance, the second set of computer systems may provide program instructions to the first set of computer systems for execution. In short, the phrases "computer-readable storage medium" and "computer-readable medium" may include two or more media that may reside in different locations, e.g., in different computers that are connected over a network.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . W, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . W, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement of such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used to transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

The invention claimed is:

1. An apparatus, comprising:
ray intersect accelerator circuitry configured to:
    access a traversal stack that stores data for traversal of multiple levels of a bounding volume hierarchy (BVH) acceleration data structure (ADS) according to a depth-first search to retrieve:
        coordinates of a first bounding region for a child node; and
        a first local ray parameter value that indicates a point along a ray at which an intersection with a second bounding region for the child node's parent node was detected; and
    compare the first local ray parameter value with a first end ray parameter value to determine whether to traverse to the child node as part of traversal of the ADS;
wherein:
    the ADS includes transform nodes, including the child node;
    the apparatus is configured to transform ray coordinates in conjunction with traversal to transform nodes; and
    the ray intersect accelerator circuitry is configured:
        for the transform nodes, to perform comparison of a local ray parameter value with an end ray parameter value to determine whether to traverse to the transform nodes, including the comparison of the first local ray parameter value for the child node; and
        for non-transform nodes of the ADS, not to perform the comparison.

2. The apparatus of claim 1, wherein the ray intersect accelerator circuitry is further configured to:
    generate the local ray parameter value based on a determined entry intersection point between the ray and the second bounding region; and
    write the coordinates and the local ray parameter value to the traversal stack in response to detecting intersections for multiple child nodes of the parent node.

3. The apparatus of claim 1, wherein the ray intersect accelerator circuitry is configured not to traverse to the node corresponding to the child node in response to the local ray parameter value being greater than the end ray parameter value.

4. The apparatus of claim 1, wherein the apparatus is configured to, prior to accessing the traversal stack:

perform one or more primitive tests based on traversal past a sibling node of the child node; and update the end ray parameter value based on the one or more primitive tests.

5. The apparatus of claim 1, wherein:

the apparatus is configured, in response to determining not to traverse to the child node, not to transform ray coordinates for the child node.

6. The apparatus of claim 1, wherein:

the ray intersect accelerator circuitry is configured to generate the local ray parameter value based on an intermediate value that is computed as part of a bounding region intersection test; and the local ray parameter value is encoded using a smaller number of bits than coordinates of the ray.

7. The apparatus of claim 1, further comprising:

storage circuitry configured to store the coordinates of the ray and a current end ray parameter value for the ray.

8. The apparatus of claim 1, wherein the apparatus is a computing device that further comprises:

a display;

a central processing unit; and a network interface.

9. A method, comprising:

accessing, by a computing system, a traversal stack that stores data for traversal of multiple levels of a bounding volume hierarchy (BVH) acceleration data structure (ADS) according to a depth-first search to retrieve:

coordinates of a first bounding region for a child node; and a first local ray parameter value that indicates a point along a ray at which an intersection with a second bounding region for an ancestor node of the child node was detected;

comparing, by the computing system, the first local ray parameter value with a first end ray parameter value to determine whether to traverse to the child node as part of traversal of the ADS; and traversing, by the computing system, the ADS based on the determination to generate intersection results for the ray, including:

for transform nodes of the ADS, comparing a local ray parameter value with an end ray parameter value to determine whether to traverse to the transform nodes, including the comparing the first local ray parameter value for the child node; and for non-transform nodes of the ADS, traversing to the transform nodes without comparing a local ray parameter value with an end ray parameter value.

10. The method of claim 9, further comprising:

generating, by the computing system, the local ray parameter value based on a determined entry intersection point between the ray and the second bounding region; and writing, the computing system, the coordinates and the local ray parameter value to the traversal stack in response to detecting intersections for multiple child nodes of the ancestor node.

11. The method of claim 9, wherein the comparing determines that the local ray parameter value is greater than the end ray parameter value and the traversing does not traverse to the child node as part of traversal of the ADS.

12. The method of claim 9, wherein the comparing is performed in response to determining that the child node is an instance node.

13. The method of claim 9, wherein the local ray parameter value is encoded using a smaller number of bits than coordinates of the ray.

14. The method of claim 9, further comprising:

storing, by the computing system in a ray data cache, the coordinates of the ray and a current end ray parameter value for the ray.

15. A non-transitory computer-readable medium having instructions of a hardware description programming language stored thereon that, when processed by a computing system, program the computing system to generate a computer simulation model, wherein the model represents a hardware circuit that includes:

ray intersect accelerator circuitry configured to:

access a traversal stack that stores data for traversal of multiple levels of a bounding volume hierarchy (BVH) acceleration data structure (ADS) according to a depth-first search to retrieve:

coordinates of a first bounding region for a child node; and a first local ray parameter value that indicates a point along a ray at which an intersection with a second bounding region for the child node's parent node was detected; and compare the first local ray parameter value with a first end ray parameter value to determine whether to traverse to the child node as part of traversal of the ADS;

wherein:

the ADS includes transform nodes, including the child node;

the circuit is configured to transform ray coordinates in conjunction with traversal to transform nodes; and the ray intersect accelerator circuitry is configured:

for the transform nodes, to perform comparison of a local ray parameter value with an end ray parameter value to determine whether to traverse to the transform nodes, including the comparison of the first local ray parameter value for the child node; and for non-transform nodes of the ADS, not to perform the comparison.

16. The non-transitory computer-readable medium of claim 15, wherein the ray intersect accelerator circuitry is further configured to:

generate the local ray parameter value based on a determined entry intersection point between the ray and the second bounding region; and write the coordinates and the local ray parameter value to the traversal stack in response to detecting intersections for multiple child nodes of the parent node.

17. The non-transitory computer-readable medium of claim 15, wherein the ray intersect accelerator circuitry is configured not to traverse to the node corresponding to the child node in response to the local ray parameter value being greater than the end ray parameter value.

18. The non-transitory computer-readable medium of claim 15, wherein the circuit is configured to, prior to accessing the traversal stack:

perform one or more primitive tests based on traversal past a sibling node of the child node; and update the end ray parameter value based on the one or more primitive tests.

19. The non-transitory computer-readable medium of claim 15, wherein:

the circuit is configured to, in response to determining not to traverse to the child node, avoid transforming ray coordinates for the child node.

* * * * *